US010661774B2

(12) United States Patent
Hecker et al.

(10) Patent No.: US 10,661,774 B2
(45) Date of Patent: May 26, 2020

(54) METHOD FOR INCREASING THE OPERATIONAL SAFETY OF FUNCTIONAL PARTS OF A VEHICLE BRAKE EXPOSED TO THERMAL STRESS

(71) Applicant: KNORR-BREMSE Systeme fuer Nutzfahrzeuge GmbH, Munich (DE)

(72) Inventors: Falk Hecker, Markgroeningen (DE);
Werner Koch, Deggingen (DE);
Mathias Mayr, Germering (DE);
Robert Theil, Tuerkenfeld (DE);
Alexander Werth, Munich (DE)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 123 days.

(21) Appl. No.: 15/784,827

(22) Filed: Oct. 16, 2017

(65) Prior Publication Data
US 2018/0037210 A1 Feb. 8, 2018

Related U.S. Application Data

(63) Continuation of application No. PCT/EP2016/058336, filed on Apr. 15, 2016.

(30) Foreign Application Priority Data

Apr. 17, 2015 (DE) .................. 10 2015 105 862

(51) Int. Cl.
*G06F 7/70* (2006.01)
*B60T 17/22* (2006.01)
(Continued)

(52) U.S. Cl.
CPC ........... *B60T 17/221* (2013.01); *B60Q 5/005* (2013.01); *B60T 7/20* (2013.01); *B60T 8/171* (2013.01);
(Continued)

(58) Field of Classification Search
CPC .. B60T 17/221; B60T 8/171; B60T 2270/406; B60T 7/20; B60T 8/1708;
(Continued)

(56) References Cited

U.S. PATENT DOCUMENTS 5,079,947 A * 1/1992 Feldmann ............... B60T 17/22
340/453
2002/0104717 A1* 8/2002 Borugian .............. B60T 17/221
188/1.11 E (Continued)

FOREIGN PATENT DOCUMENTS

CN 2475637 Y 2/2002
CN 102001330 A 4/2011
(Continued)

OTHER PUBLICATIONS

International Search Report (PCT/ISA/210) issued in PCT Application No. PCT/EP2016/058336 dated Jul. 25, 2016 with English translation (Six (6) pages).
(Continued)

*Primary Examiner* — Shardul D Patel
(74) *Attorney, Agent, or Firm* — Crowell & Moring LLP

(57) ABSTRACT

A method is provided for increasing the operational safety of at least one thermally stressed functional part of at least one vehicle brake, in particular of a commercial vehicle and/or a trailer, and/or for reducing brake wear and/or drive power, wherein the method has the following steps: inputting a temperature signal of the at least one brake, which temperature signal represents at least one temperature of the brake and/or of a functional part of the brake detected by at least one sensor, and inputting a brake request signal and/or brake pressure signal for the at least one brake; determining a thermal error condition by using the temperature signal and the brake requirement signal and/or brake pressure signal; and providing an adapted brake requirement signal and/or
(Continued)

adapted brake pressure signal using the determined thermal error condition in order to increase the operational safety of the at least one functional part of the at least one vehicle brake exposed to thermal stress, and/or to reduce the brake wear and/or the drive power.

19 Claims, 3 Drawing Sheets

(51) Int. Cl.

| | | |
|---|---|---|
| *F16D 66/00* | (2006.01) | |
| *B60T 17/18* | (2006.01) | |
| *B60Q 5/00* | (2006.01) | |
| *B60T 7/20* | (2006.01) | |
| *G07C 5/00* | (2006.01) | |
| *G07C 5/08* | (2006.01) | |
| *B60T 8/17* | (2006.01) | |
| *B60T 8/171* | (2006.01) | |
| *G06Q 10/00* | (2012.01) | |

(52) U.S. Cl.
CPC ............ *B60T 8/1708* (2013.01); *B60T 17/18* (2013.01); *B60T 17/22* (2013.01); *F16D 66/00* (2013.01); *G07C 5/006* (2013.01); *G07C 5/008* (2013.01); *G07C 5/0808* (2013.01); *G07C 5/0816* (2013.01); *B60T 2270/406* (2013.01); *F16D 2066/001* (2013.01); *G06Q 10/20* (2013.01)

(58) Field of Classification Search
CPC ....... B60T 17/18; B60T 17/22; G07C 5/0816; G07C 5/008; G07C 5/0808; G07C 5/006; B60Q 5/005; G06Q 10/20; F16D 2066/001; F16D 66/00
USPC .............................................. 701/70; 702/34
See application file for complete search history.

(56) References Cited

U.S. PATENT DOCUMENTS

| | | | | |
|---|---|---|---|---|
| 2009/0134698 | A1* | 5/2009 | Herges | ................ B60T 8/1766 |
| | | | | 303/113.2 |
| 2010/0023235 | A1* | 1/2010 | Kremer | ................ B60T 8/1706 |
| | | | | 701/70 |
| 2010/0030490 | A1* | 2/2010 | Wright | .................... F16D 66/02 |
| | | | | 702/34 |
| 2011/0054758 | A1* | 3/2011 | Bae | ......................... B60T 8/175 |
| | | | | 701/92 |
| 2014/0316666 | A1* | 10/2014 | Bordes | ...................... B60T 7/12 |
| | | | | 701/70 |

FOREIGN PATENT DOCUMENTS

| | | |
|---|---|---|
| DE | 44 31 045 A1 | 3/1996 |
| DE | 44 31 045 C2 | 8/1999 |
| DE | 102 43 127 A1 | 3/2004 |
| EP | 2 149 721 A1 | 2/2010 |
| JP | 63-43974 U | 3/1988 |
| JP | 8-156774 A | 6/1996 |
| RU | 2 184 287 C2 | 6/2002 |
| WO | WO 2012/045953 A1 | 4/2012 |

OTHER PUBLICATIONS

German-language Written Opinion (PCT/ISA/210) issued in PCT Application No. PCT/EP2016/058336 dated Jul. 25, 2016 (Five (5) pages).
International Search Report (PCT/ISA/210) issued in PCT Application No. PCT/EP2016/058335 dated Jul. 25, 2016 with English translation (Six (6) pages).
German-language Written Opinion (PCT/ISA/210) issued in PCT Application No. PCT/EP2016/058335 dated Jul. 25, 2016 (Five (5) pages).
Russian-language Office Action issued in counterpart Russian Application No. 2017139803/11 (069199) dated Oct. 31, 2018 with English translation (19 pages).
Chinese-language Office Action issued in counterpart Chinese Application No. 201680029826.8 dated Oct. 31, 2018 with English translation (18 pages).
Japanese-language Office Action issued in counterpart Japanese Application No. 2017-550571 dated Oct. 9, 2019 with English translation (nine (9) pages).

* cited by examiner

| p | T | t |
|---|---|---|
| 0 | ↗↗ | h |
| ↗ | ↗↗ | h |
| ↙ | ↙ | h, M |
| 0 | ↗ | h |

METHOD FOR INCREASING THE OPERATIONAL SAFETY OF FUNCTIONAL PARTS OF A VEHICLE BRAKE EXPOSED TO THERMAL STRESS

CROSS REFERENCE TO RELATED APPLICATIONS

This application is a continuation of PCT International Application No. PCT/EP2016/058336, filed Apr. 15, 2016, which claims priority under 35 U.S.C. § 119 from German Patent Application No. 10 2015 105 862.6, filed Apr. 17, 2015, the entire disclosures of which are herein expressly incorporated by reference.

This application contains subject matter related to U.S. application Ser. No. 15/784,817, entitled "Method and Control Device for Avoiding an Overheating of a Brake of a Vehicle" filed on even date herewith.

BACKGROUND AND SUMMARY OF THE INVENTION

The invention relates to a method for increasing the operational reliability of thermally stressed functional parts of a brake of a vehicle, in particular a commercial vehicle and/or a trailer. The invention also relates to a corresponding controller.

For operational reasons, a series of, in particular, safety relevant functional parts of brakes, are subject to thermal stress which results from the friction producing installation of brake pads against a brake disc. This can also arise inter alia from the temperature changes which usually occur during the driving operation.

These thermal stresses can give rise to mechanical and/or chemical changes in the materials of the functional parts, wherein, for example, so called vitrification of the friction linings of brake pads give rise to a coefficient of friction loss on the frictional face thereof.

Thermal overloading of the functional parts involved can also result from what is referred to as overheating. In this context, no intentional braking occurs but rather the overheating occurs as a result of the brake pads being slightly applied, which on a continuous basis can give rise to thermal damage to the brake pads and the mechanical parts of the disc brake, such as guide elements, seals or the like.

Continuous use of the brake when traveling downhill is also to be considered critical with respect to thermal overloading, and can also give rise to damage to the components involved, such as easy jamming of the activation elements, for example of a brake application device, as a result of which an undesired residual slipping torque is generated, resulting in an excessively high continuous temperature.

In order to detect the temperature in the region of the disc brake, it is proposed, for example in DE 102 43 127 A1, to use an inductive signal generator as a multifunctional element with which, inter alia, temperature dependent signals are generated. These signals are compared with a setpoint value in an evaluation device and a, for example, acoustic signal is output when said setpoint value is exceeded.

Document DE 44 31 045 C2 describes a sensor arrangement for jointly measuring two variables, e.g. the rotational speed of a wheel of a motor vehicle which has a brake, and the temperature of the brake by means of an inductive sensor.

As a consequence of this, the components involved have hitherto been replaced immediately, which requires at least one down time of the vehicle, which, of course, entails considerable costs, in particular resulting from the down times of the vehicle, and under certain circumstances, from the acquisition of spare parts and the assembly and disassembly work.

The invention is based on the object of developing a method which increases the service life of the disc brake and optimizes its functional reliability.

This and other objects are achieved in accordance with embodiments of the invention.

A method according to the invention is provided for increasing the operational reliability of at least one thermally stressed functional part of at least one brake of a vehicle, in particular a commercial vehicle and/or a trailer, and/or for reducing brake wear and/or drive energy. The method comprises the following steps:

(a) reading in a temperature signal of the at least one brake, which temperature signal represents at least one temperature of the brake and/or of a functional part of the brake which is detected by at least one sensor, and reading in a braking request signal and/or brake pressure signal for the at least one brake;

(b) determining a thermal fault situation when using the temperature signal and the braking request signal and/or brake pressure signal; and (c) supplying an adapted braking request signal and/or adapted brake pressure signal using the determined thermal fault situation, in order to increase the operational reliability of the at least one thermally stressed functional part of the at least one brake and/or to bring about a reduction in the brake wear and/or the drive energy.

The method according to the invention constitutes, as it were, a thermal management system which not only senses the operationally induced temperatures by means of sensors which supply and evaluate the operationally induced temperatures as a temperature signal which represents the temperature, but when necessary adjusts the functional parts, as far as possible. In this way, by using the temperature signal a regulating signal is supplied which constitutes a reference variable for at least one functional part. In this context, the adjustment takes place under computer control. The method can be executed on a brake or in a brake system. In this context, the brake can be, for example, a disc brake or a drum brake.

That is to say, in contrast to the prior art in which there is only the possibility of activating a signal after sensing of the temperatures and after their setpoint values have been exceeded, in order to replace the respective functional parts directly, the invention permits these functional parts to change to a new operationally reliable state without replacing the corresponding component immediately. This advantageously increases the economic viability, since service lives of the wheel brakes or the respective functional parts are increased.

In this context, in yet another embodiment the signals can be passed on in a wireless fashion. This means that signals are transmitted from the sensor to the evaluation device and from there, if appropriate, to an actuator, in a wireless fashion, that is to say by radio or the like, wherein the regulation of the functional parts occurs taking into account the state of the disc brake.

The measurement of the temperature can take place directly or indirectly at various functional parts. It is therefore possible for the temperature signal which represents at least one temperature of at least one functional part to be supplied by a temperature sensor such as, for example, a thermoelement, a resistance thermometer or a contactless measuring thermometer such as, for example, a radiation thermometer, or can be derived from another sensor signal. A corresponding sensor can be arranged, for example, on a pole wheel, on the brake disc or disc brake, on one or both brake pads or on a brake caliper part, likewise on electronic components of the type of separate or integrated thermoelements, such as are used for temperature compensation. In this case, the temperature measurement occurs at lining wear sensors which are integrated into the brake pads.

In one embodiment, the temperature measurement can be carried out using a pole wheel and/or an ABS sensor. One sensor can therefore advantageously be used for two functions. It is therefore possible for a signal amplitude of the pole wheel sensor to represent a temperature of a functional part, wherein the frequency of the rotational speed and the amplitude of the temperature correspond. However, it is to be borne in mind here that when the pole wheel is connected to the brake disc, the design thereof, depending on whether, for example, a pot disc or neck disc is used, and the position of the pole wheel, influences a time profile of the temperature signal and the level of the temperature. The method can detect these differences by means of plausibility checking of the data with an electronic brake system (EBS), wherein the brake pressure, braking duration and speed are used to determine the implemented braking energy.

Radiation pyrometers can be used as contactless temperature sensors, wherein in the case of a disc brake a radiation pyrometer is preferably supplied on both sides of the brake disc.

An infrared thermometer in the form of, for example, a narrow band pyrometer, with a germanium photodiode, indium gallium arsenide photodiode or band radiation pyrometer can be used as a radiation pyrometer, as can a quotient pyrometer.

States of the brake, such as e.g. of a disc brake, which are adversely affected thermally, result, for example, from vitrifying brake pads which occur as a result of an excessively low contact pressure and excessively low temperature at the brake pads, wherein a loss of the coefficient of friction of the brake linings occurs. This can result e.g. from the predominant use of continuous action brake systems, such as e.g. retarders and other secondary additional brake systems with braking energy recovery, such as are used for example in hybrid vehicles. Here, only a low brake pressure is applied during the braking process and only low temperatures are achieved.

One embodiment provides that in the case of an excessively low brake pressure and/or excessively low temperatures, brakes which are supported on the disc brake, such as retarders or recuperative brakes, are switched off, and the excessively low brake pressure is increased in a corresponding way. This can prevent vitrification.

In the case of the detection of an excessively low brake pressure and an excessively low temperature at the brake or the adjacent components, such as an assigned axle, a load equalization can be requested or initiated between a multiplicity of brakes. It is therefore possible, in the case of the detection of an excessively low brake pressure and an excessively low temperature at the brake or the adjacent components, such as an assigned axle, for a controller (ECU) to send a request to a closed-loop control device, with the result that in the event of the presence of vitrified linings, supporting brakes are switched off in order to increase the braking force and as a result the temperature at the brake with vitrifying linings. Supporting brakes can be retarders or recuperative brakes which are attached to the axle or the drive train. That is to say, on a case by case basis, the service brakes can be used before an engine brake and/or the retarders or recuperative brakes. It is therefore possible to apply a relatively large braking force to the vitrifying brake pads without increasing an overall deceleration of the vehicle, wherein the braking force which is increased as a result, on the vitrifying brake pads, counteracts the state of vitrification, and the coefficient of friction of the brake pads is increased again.

As a result, the base temperature of the brake, such as e.g. of a disc brake, is held at a defined increased level, with the result that the specified cold wear or the vitrification of the brake pads is avoided. In addition, there is the advantageous possibility of the vehicle driver detecting, on the basis of a display, the transmitted signals when a setpoint temperature of all the disc brakes is exceeded, and of reacting accordingly, in order to avoid corresponding continuous loading of the disc brakes.

Slight constant increase in the temperature at the brake pads when a wheel is rotating can indicate a temporary fault state of the mechanical brake, e.g. of the guidance means of the brake pad or of the brake caliper guidance means.

If the state is detected, a relatively high brake pressure can be applied once to the disc brake during the next braking operation, in order to bring about a release of the jamming guidance means. Alternatively, in the case of a stationary vehicle the brake can be activated in order to bring about a release of the jamming guidance means. If this does not lead to an improvement in the malfunction, the braking request for the disc brake can be reduced and an visual and/or acoustic warning message can be triggered.

Overheating of the brake can occur owing to a malfunction which results from no longer adequate clearance for the free movement of the brake disc and of residual braking torque which occurs. Heat which occurs in such a state of the brake can give rise to a self amplifying effect.

This residual braking torque, caused by thermal expansion of the brake disc and/or brake pads, can be compensated by actively moving the brake pads away from the brake disc (increasing the clearance), e.g. by means of a bidirectional re adjusting element. This actively controlled increase in the clearance can be initiated using the invention. It is therefore possible to return the brake to a functionally capable state, or avoid undesired faulty behavior, by a one off large braking request and/or by reducing the braking request.

As already mentioned with respect to the prior art, longlasting downhill travel can lead to continuously increased temperature of the disc brake, resulting in an unacceptable operating state.

By means of the invention, there is the possibility, in the case of long-lasting high temperatures during a braking operation, to distribute the braking request between the brakes or disc brakes which are assigned to the respective wheels, in such a way that it is not one brake or the brakes of an axle which are stressed with an increased temperature but rather all the brakes in such a way that the temperature at the hottest disc brake is reduced. In this context, the braking request to this brake is reduced and the braking request to the others is increased, with the same or even increased vehicle deceleration.

Therefore, in a further embodiment, when the constant, relatively high temperature is detected after braking with a relatively high brake pressure, an acoustic and/or visual signal is output. This is advantageous because in this way the driver is forewarned.

A further warning can be supplied in yet another embodiment when a continuously increased temperature is detected, in particular in the case of long-lasting downhill travel of the vehicle, in that a warning signal is supplied.

The thermal state of the brakes can be optimized in that the distribution of the braking request takes place only in a stable driving range, i.e. in the low brake pressure and deceleration range. In this context, the braking performance between a multiplicity of brakes of one axle can be equalized. In this context, equalization of the braking performance can take place between brakes of a multiplicity of axles. In order to obtain the performance in the case of emergency braking and full braking, the braking request distribution can be limited to the stable driving range. The stable driving range can be arranged in the low brake pressure and deceleration range, with the result that the effectiveness of the brake can be optimized depending on the thermal operational state.

Accordingly, in one embodiment, the brake pressure is adapted in a stable driving state of the vehicle, in particular in the case of a low brake pressure and/or low deceleration values, in particular in the case of a brake pressure of less than 7 bar, in particular of less than 5 bar, in particular of less than 3 bar, in particular in the case of a deceleration value of less than 3 m/s. In this way, an advantageous adaptation capability can be obtained.

This takes place only in a stable driving state which is characterized by low pressure. In the case of full braking/an emergency stop, all the brakes are activated without restriction.

If the evaluation unit detects a reduction in the frictional work of a brake, e.g. as a result of a reduced temperature emission or a reduced emission value, and therefore a reduced coefficient of friction of the friction pairing, what is referred to as cleaning braking can be initiated. The described state can be caused by preceding high thermal stressing, e.g. in the case of a disc brake, in particular with transfer of material to the brake disc or as a result of a brake which has been used little over a relatively long period of time, which is also referred to as brake linings "which have gone to sleep".

In the case of adaptive braking of less than 0.3 g, the braking is distributed among the brakes unequally, i.e. within stable driving parameters, with the result that the brake which is adversely affected thermally receives a braking pressure request which causes the brake lining surface to be cleaned. Disc brakes which are not thermally loaded receive a braking request which is reduced by this amount.

For this purpose, in another embodiment a reduction in the frictional work of the disc brake can be determined on the basis of a reduced temperature of emissions and/or a reduced emission value and/or in the case of a temperature below a temperature threshold value when a brake pressure is below a brake pressure threshold value.

When an adaptation braking operation of less than 0.3 g is determined, in yet another embodiment, a different brake pressure can be applied to the disc brakes.

In the case of braking requests for an emergency stop, i.e. of greater than 0.3 g or an ABS control situation, the braking request is not distributed. The equalization of the braking request can also take place in a diagonal fashion, i.e. for example front right and rear left. It is therefore advantageously possible to maintain a stable driving state.

The level of the temperature and the time profile of the increase in temperature and decrease in temperature after a braking operation has taken place can be differentiated between two vehicles on the basis of a wide variety of vehicle configurations and wheel house configurations, for example in the case of buses and trucks. This can be mapped in an analogous model. In order to obtain corresponding parameters here it is possible to check, after the application of the brake pressure, the time in which a temperature is set.

Therefore, in one embodiment, during a braking operation the temperatures which are reached within what time and/or with what braking pressure applied can be checked in order to determine a temperature profile over the time and/or over a brake pressure profile and to determine the thermal fault situation using the temperature profile. In this context, the advantage is obtained of being able to determine a fault on the basis of which measures can be taken to eliminate a fault.

In this context, the signal which is output can be checked by comparison with other wheels or brakes of the vehicle. The analogous model can map the conduction of heat or the transfer of heat and additionally or alternatively the thermal capacity and cooling of the brake, of the adjacent components and additionally or alternatively of the surroundings.

A controller according to the invention for executing the method described above, for increasing the operational reliability of at least one thermally stressed functional part of at least one brake of a vehicle, in particular a commercial vehicle and/or of a trailer, and/or for reducing brake wear and/or drive energy has the following devices: (a) an interface for reading in a temperature signal of the at least one brake, which temperature signal represents at least one temperature of the brake and/or of a functional part of the brake which is sensed by at least one sensor, and reading in a braking request signal and/or brake pressure signal for the at least one brake; (b) a determining device for determining a thermal fault situation using the temperature signal and the braking request signal and/or brake pressure signal; and (c) a supply device for supplying an adapted braking request signal and/or adapted brake pressure signal using the thermal fault situation, in order to bring about the operational reliability of the at least one thermally stressed functional part of the at least one brake and/or reduce the brake wear and/or the drive energy. The method described above can therefore be executed advantageously.

The controller can be embodied to carry out or implement the steps of a variant of a method present here in corresponding devices. A controller can be understood to be an electrical apparatus or an electrical circuit, for example an integrated circuit. A controller can also be understood to be a closed loop control device, an ECU or an open loop control device. The controller can be part of an electronic brake system. The controller can be designed to receive and output signals via suitable interfaces. The controller can also efficiently implement by means of the controller the idea on which the invention is based.

A controller can be understood to be here an electrical apparatus which processes sensor signals and outputs control signals and/or data signals as a function of the sensor signals. The interfaces of the control device can be implemented by means of hardware and/or software. In the case of a hardware implementation, the interfaces can be, for example, part of a so called system ASIC which includes a wide variety of functions of the control device. However, the interfaces can also be implemented as separate integrated circuits, or can be composed at least partially of discrete components. In the case of a software implementation, the interfaces can be software modules which are present, for example, on a microcontroller, along with other software modules.

A brake for a vehicle, in particular a commercial vehicle and/or a trailer, is designed to supply a temperature signal and/or to receive an adapted braking request for increasing the operational reliability of at least one thermally stressed functional part of the brake and/or reducing the brake wear and/or drive energy.

A brake system for a vehicle, in particular, a commercial vehicle and/or a trailer, comprises the controller described above, a first brake described above arranged on an axle and a second brake which is arranged on the axle, on a side of the axle lying opposite the first brake with respect to a vehicle longitudinal axis, or on a further axle.

A vehicle, in particular a commercial vehicle and/or a trailer, has the brake system described above.

A computer program product with program code which can be stored on a machine readable medium such as a semiconductor memory and is used to carry out the method according to one of the embodiments described above is also advantageously used if the computer program product is executed on a processor or a controller.

Moreover, the method according to the invention can also be updated by means of an update of a software for an electronic brake system (EBS) in such a way that new fault states such as are determined in the field mode or in the field trial are stored.

By means of the information on the temperature and the wear, the brakes can be operated in such a way that the braking performance including the brake wear is optimized. The downtimes, in particular the brake pads of the individual disc brakes which come into use on a vehicle can therefore be approximated.

A further advantage arises in an embodiment if detected values relating to fault states and wear are transmitted via a logbook system or geolocalization system to workshops for supplying spare parts or planning service intervals. This relates, in particular, to the supplying of spare parts such as brake pads, replacement brakes and the planning of service intervals, which is possible by means of the thermal detection of the state of the disc brake.

Other objects, advantages and novel features of the present invention will become apparent from the following detailed description of one or more preferred embodiments when considered in conjunction with the accompanying drawings.

BRIEF DESCRIPTION OF THE DRAWINGS

FIG. 3 is an overview of thermal fault situations according to an exemplary embodiment of the present invention in table form.

In the following description of the preferred exemplary embodiments of the present invention, identical or similar reference symbols are used for the elements which are illustrated in the various drawings and similarly acting elements, wherein a repeated description of these elements is omitted.

DETAILED DESCRIPTION OF THE DRAWINGS

Figure 1:
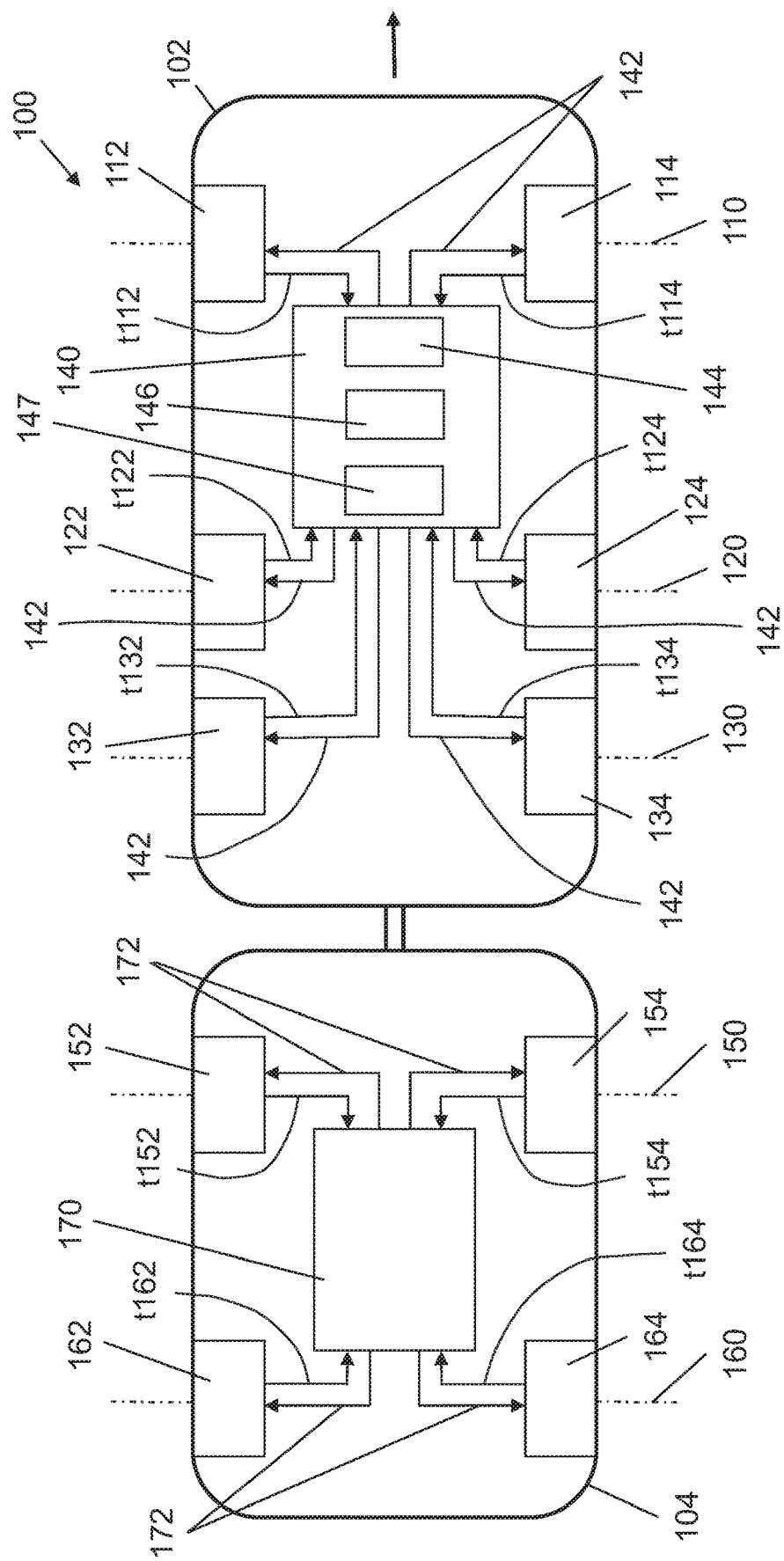
FIG. 1 is a schematic block illustration of a vehicle with a brake system according to an exemplary embodiment of the present invention.

FIG. 1 shows a schematic block illustration of a vehicle 100 with a brake system according to an exemplary embodiment of the present invention. In the illustrated exemplary embodiment, the vehicle 100 comprises a commercial (utility) vehicle 102 and a trailer 104. A forward direction of travel is indicated with an arrow.

The commercial vehicle 102 has three axles 110, 120, 130, each with two brakes 112, 114, 122, 124, 132, 134, wherein in each case one brake 112, 122, 132 is arranged on the right hand side of the vehicle in the direction of travel of the commercial vehicle 102, and one brake 114, 124, 134 is arranged on the left hand side of the vehicle. Furthermore, the vehicle 102 has a controller 140. The brakes are designed each to supply at least one temperature signal t112, t114, t122, t124, t132, t134, which temperature signal is fed to the controller 140 via a respective signal line and read-in by the controller 140. The controller 140 is designed to supply one braking request signal 142 per brake 112, 114, 122, 124, 132, 134. The braking request signal 142 is transmitted to each brake 112, 114, 122, 124, 132, 134 via a respectively associated signal line.

The trailer 104 has two axles 150, 160, each of which has two brakes 152, 154, 162, 164, wherein in each case one brake 152, 162 is arranged on the right hand side of the vehicle in the direction of travel of the trailer 104, and one brake 154, 164 is arranged on the left hand side of the vehicle. Furthermore, the trailer 104 has a trailer controller 170. The brakes 152, 154, 162, 164 are each designed to supply at least one temperature signal t152, t154, t162, t164, which temperature signal is fed to the trailer controller 170 via a respective signal line and read-in by the trailer controller 170. The trailer controller 170 is designed to supply one braking request signal 172 per brake 152, 154, 162, 164. The braking request signal 172 is transmitted to each brake 152, 154, 162, 164 via a respectively associated signal line.

Figure 2:
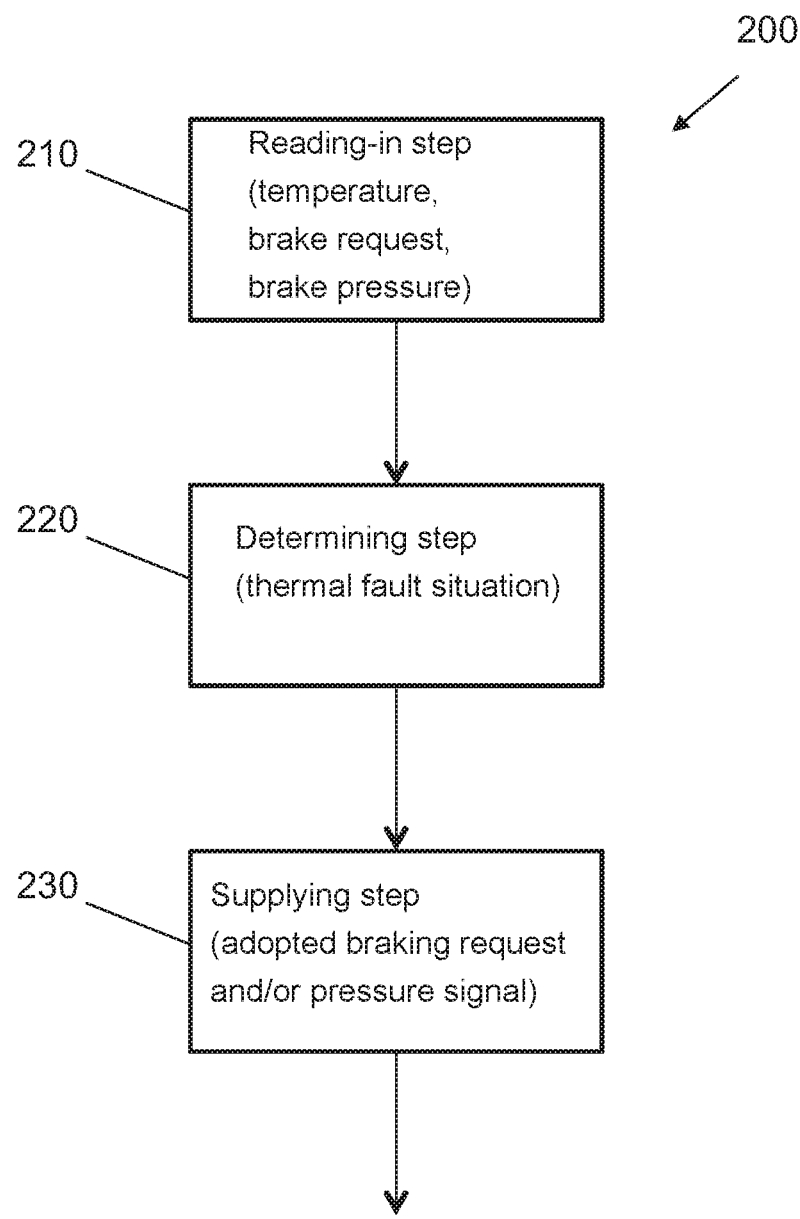
FIG. 2 is a flowchart of a method according to one exemplary embodiment of the present invention.

The controllers 140, 170 are designed each to execute the method described in FIG. 2. In a first exemplary embodiment, the controller 140 in the commercial vehicle is designed to execute the method for the brakes of the commercial vehicle 102 and for the brakes of the trailer 104. In an alternative exemplary embodiment, the trailer controller 170 of the trailer 104 is designed to execute the method for the brakes of the trailer independently of the commercial vehicle 102.

The method is subjected to a state of the vehicles 102, 104 in which they leave a stable driving state in the case of an emergency stop/full braking. Equalization of a braking request takes place within one axle, between two axles, diagonally (e.g. FR/RL) across the vehicle 100, 102, 104 or between the commercial vehicle 102 and the trailer 104.

Most braking operations with the customary vehicle configurations take place in the lower brake pressure range and deceleration range. In order to obtain the performance during emergency braking and full braking, the braking request distribution is used only in the stable driving range which is arranged in the low pressure range and deceleration range.

Figure 3:
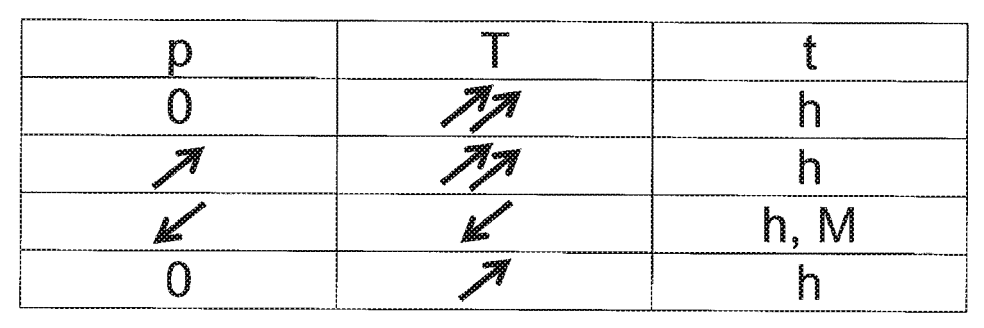

The controllers 140, 170 are designed to carry out state monitoring of the brakes of the vehicles 102, 104. The brakes can be operated by means of the information about their respective temperature and their respective wear in such a way that the brake power and the wear on the vehicle 100 are optimized, and the brake pad wear or brake pad service lives within the vehicle/trailer are approximated. The braking request can therefore be passed to the individual brakes with modification as a function of the state monitoring. FIG. 3 explains various thermal fault situations and possible ways of repairing them or outputting a corresponding warning. Predictive maintenance can be planned by storing the detected thermal fault situations.

The controller 140 has the following devices in this example. An interface 144 is provided for reading in a temperature signal of the at least one brake, which temperature signal represents at least one temperature of the brake and/or of a functional part of the brake which is sensed by at least one sensor, and reading in a braking request signal and/or brake pressure signal for the at least one brake. A determining device 146 is provided for determining a thermal fault situation using the temperature signal and the braking request signal and/or brake pressure signal. And, a supply device 148 is provided for supplying an adapted braking request signal and/or adapted brake pressure signal using the thermal fault situation, in order to bring about the operational reliability of the at least one thermally stressed functional part of the at least one brake and/or reduce the brake wear and/or the drive energy.

The trailer controller 170 can be constructed in the same way.

In one exemplary embodiment (not shown), the controller 140 of the commercial vehicle 102 and the trailer controller 170 of the trailer 104 are coupled to one another. Therefore, when a thermal fault occurs and is detected, a braking request can be distributed between the trailer 104 and the commercial vehicle 102. In another exemplary embodiment, the two controllers 140, 170 operate independently of one another. In a further exemplary embodiment, the vehicle 100 has a controller 140 which distributes a braking request among the axles 110, 120, 130 of the commercial vehicle 102 and the axles 150, 160 of the trailer 104 when a thermal fault is detected.

FIG. 2 shows a method 200 according to an exemplary embodiment of the present invention. The method 200 for increasing the operational reliability of at least one thermally stressed functional part of at least one brake for a vehicle, and additionally or alternatively for reducing brake wear and alternatively or additionally reducing drive energy, comprises a reading in step 210, a determining step 220 and a supplying step 230. The vehicle can be a variant of an exemplary embodiment (shown in FIG. 1) of a vehicle 100.

In the reading in step 210, a temperature signal of the at least one brake 112, 114, 122, 124, 132, 134, 152, 154, 162, 164 of the vehicle 100, which temperature signal represents at least one temperature of the brake, sensed by at least one sensor, 112, 114, 122, 124, 132, 134, 152, 154, 162, 164 of the vehicle 100 and/or of a functional part of the brake 112, 114, 122, 124, 132, 134, 152, 154, 162, 164 of the vehicle 100, and a braking request signal, and additionally or alternatively a brake pressure signal for the at least one brake 112, 114, 122, 124, 132, 134, 152, 154, 162, 164 of the vehicle 100 are/is read in. In the determining step 220, a thermal fault situation is determined using the temperature signal, the braking request signal and/or brake pressure signal. In the supplying step 230, an adapted braking request signal and/or adapted braking pressure signal are/is supplied using the thermal fault situation, in order to increase the operational reliability of the at least one thermally stressed functional part of the at least one brake 112, 114, 122, 124, 132, 134, 152, 154, 162, 164 of the vehicle 100 and/or to reduce the brake wear and/or the drive energy.

FIG. 3 shows an overview of thermal fault situations according to an exemplary embodiment of the present invention in table form. Each column shows a thermal fault situation of a brake of a vehicle. The first line represents the fault situation of overheating, the second line represents the fault situation of misuse, such as for example during or after downhill travel, the third line shows a fault situation of vitrification, and the fourth line shows a fault situation of a jamming guidance means. The first column represents the state of the brake pressure, the second column represents the temperature, and the third column represents the time profile.

The arrows which point upward and to the right symbolize an increase in the respective column value, while the arrows which point to the left and downward signify a decrease in the respective column value.

In the third column, the letter "h" signifies the time value "hour" and the letter "M" signifies the time value "month".

The fault situation of overheating can be caused by a malfunction of the brake if, for example sufficient clearance can no longer be obtained for free movement of the brake disc. Heat occurring at such a brake gives rise to a self amplifying effect. The fault situation of overheating is characterized by a temperature which is (highly) increased persistently over a long period of time without a braking request being present or a brake pressure signal being present. Here, the brake can be returned to a functionally capable state, or an undesired fault behavior can be avoided, by a one off high braking request (for example brake pressure higher than 8 bar over at least one second) and/or by reducing the braking request.

In the fault situation of misuse, the continuous increased temperature of the brake can occur as a result of, for example, long-lasting downhill travel, which temperature is necessary but constitutes an unacceptable operating state. In the case of long-lasting temperatures above a defined threshold value during a braking operation there is the possibility of distributing the braking request between the wheels/axles in such a way that one brake/one axle is not stressed with an increased temperature but rather all the axles are stressed in such a way that the temperature at the hottest brake is reduced by reducing the braking request to this brake/axle, and the braking request to the other brakes/axles are increased—in each case with the same (or better) overall vehicle deceleration.

The fault situation of the vitrification is characterized by an increased temperature at low brake pressures over a long period of time. As a result of an excessively low contact pressure and excessively low temperature at the brake pads, a loss of the coefficient of friction of the brake pads occurs. This may be triggered, for example, by the predominant use of retarders and secondary additional brake systems. Here, during braking only a small brake pressure is applied and only low temperatures are generated. As a countermeasure, the braking request to the corresponding brake is increased by virtue of the fact that another axle remains complete unbraked, and therefore a higher brake pressure can be fed to the axle with the vitrifying brake pads, or by virtue of the fact that the retarders and secondary additional brakes are temporarily switched off.

The fault situation of a temporary mechanical fault state such as, for example, a jamming guidance means is characterized by an increased temperature without brake pressure signal being present, over a relatively long period of time, for example hours. A slight increase in the temperature which is constant in a tolerance range at the brake pads when a wheel is rotating can indicate a temporary fault state of the mechanical brake, for example of the guidance means of the brake pad or the caliper guidance means. If this state is detected, a relatively high brake pressure is fed in once to this brake/axle during the next braking operation, in order to bring about a release of the jamming guidance means. If this does not bring about an improvement in the malfunction, the braking request to this brake/axle is reduced, and a warning lamp or an acoustic warning signal can be activated. Alternatively, when the vehicle is stationary the brake can be actuated at least once or repeatedly with up to the maximum brake pressure. For example, when the engine is switched off the brake is activated three times with the maximum brake pressure, for one second in each case, in order to counteract the fault situation or eliminate the fault situation.

The exemplary embodiments described are selected only by way of example and can be combined with one another.

LIST OF REFERENCE NUMBERS

100 Vehicle
102 Commercial vehicle
104 Trailer
110, 120, 130 Axle
112, 114 Brake
122, 124 Brake
132, 134 Brake
t112, t114 Temperature signal
t122, t124 Temperature signal
t132, t134 Temperature signal
140 Controller
142 Braking request signal
144 Interface
146 Determining device
148 Supply device
150, 160 Axle
152, 154 Brake
162, 164 Brake
t152, t154 Temperature signal
t162, t164 Temperature signal
170 Trailer controller
172 Braking request signal The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for increasing operational reliability of at least one thermally stressed functional part of at least one brake of a vehicle, wherein the method comprises the steps of:
   (a) reading-in a temperature signal of the at least one brake by way of a temperature measurement carried out using a pole wheel sensor and/or an ABS sensor, wherein an amplitude of a signal of the pole wheel sensor supplies temperature information, which temperature signal represents at least one temperature of the brake and/or of a functional part of the brake, and reading-in a braking request signal and/or a brake pressure signal for the at least one brake;
   (b) determining a thermal fault situation when using the temperature signal and the braking request signal and/or the brake pressure signal; and
   (c) supplying an adapted braking request signal and/or adapted brake pressure signal using the determined thermal fault situation, in order to increase the operational reliability of the at least one thermally stressed functional part of the at least one brake.

2. The method as claimed in claim 1, wherein the method is carried out to reduce brake wear and/or drive energy of the vehicle.

3. The method as claimed in claim 1, wherein the vehicle is a commercial vehicle and/or a trailer.

4. The method as claimed in claim 1, wherein
when a slight increase, constant in a tolerance range, in the temperature of brake pads of the brake is determined in the case of a rotating wheel, braking operation takes place at a relatively high brake pressure, once during a subsequent operational braking operation, with an unchanged braking performance of the vehicle.

5. The method as claimed in claim 4, wherein
when the constant, relatively high temperature is detected after braking with a relatively high brake pressure, an acoustic and/or visual signal is output.

6. The method as claimed in claim 1, wherein
when a continuously increased temperature is detected, a warning signal is supplied.

7. The method as claimed in claim 1, wherein
the brake pressure is adapted in a stable driving state of the vehicle in the case of a low brake pressure and/or low deceleration values.

8. The method as claimed in claim 7, wherein
the low brake pressure is a brake pressure of less than 7 bar, and the low deceleration value is a deceleration value of less than 3 m/s.

9. The method as claimed in claim 1, wherein
a reduction in frictional work of the disc brake is detected on the basis of a reduced temperature of emissions, a reduced emission value and/or in a case of a temperature below a temperature threshold value when a brake pressure is below a brake pressure threshold value.

10. The method as claimed in claim 9, wherein
when an adaptation braking operation with less than 0.3 g acting on the disc brakes is detected, a different brake pressure is applied.

11. The method as claimed in claim 1, wherein
during a braking operation, temperatures which are reached within what time and/or with what braking pressure applied are checked in order to determine a temperature profile over the time and/or over a brake pressure profile and to determine the thermal fault situation using the temperature profile.

12. The method as claimed in claim 1, wherein
at an excessively low temperature, brakes which are supported on the disc brake are switched off.

13. The method as claimed in claim 1, wherein
detected values relating to fault states and wear are transmitted via a logbook system or geo-localization system to workshops for supplying spare parts or planning service intervals.

14. The method as claimed in claim 1, wherein
the at least one temperature signal occurs directly or indirectly at a brake disc of the disc brake and/or at least one brake pad and/or at housing components by way of the temperature measurement.

15. The method as claimed in claim 1, wherein
a radiation pyrometer in the form of an infrared thermometer is further used as a sensor for measuring the temperature at the brake disc.

16. The method as claimed in claim 1, wherein the signals are passed on in a wireless fashion.

17. A controller for carrying out a method for increasing operational reliability of at least one thermally stressed functional part of at least one brake of a vehicle, and/or for reducing brake wear and/or drive energy, wherein the controller comprises:
an interface for reading-in a temperature signal of the at least one brake by way of a temperature measurement carried out using a pole wheel sensor and/or an ABS sensor, wherein an amplitude of a signal of the pole wheel sensor supplies temperature information, which temperature signal represents at least one temperature of the brake and/or of a functional part of the brake, and reading-in a braking request signal and/or brake pressure signal for the at least one brake;

a determining device for determining a thermal fault situation using the temperature signal and the braking request signal and/or brake pressure signal; and a supply device for supplying an adapted braking request signal and/or adapted brake pressure signal using the thermal fault situation, in order to bring about the operational reliability of the at least one thermally stressed functional part of the at least one brake and/or reduce the brake wear and/or the drive energy.

18. A brake system for a vehicle, comprising:

a controller as claimed in claim 17;

a first brake arranged on an axle; and a second brake which is arranged on the axle, on a side of the axle lying opposite the first brake with respect to a vehicle longitudinal axis, or on a further axle, the first and second brakes being configured to supply a temperature signal and/or to receive an adaptive request to/from the controller.

19. A computer program product comprising a non-transitory computer readable medium having stored thereon program code that, when executed by a processor, carries out the method of:

(a) reading-in a temperature signal of the at least one brake by way of a temperature measurement carried out using a pole wheel sensor and/or an ABS sensor, wherein an amplitude of a signal of the pole wheel sensor supplies temperature information, which temperature signal represents at least one temperature of the brake and/or of a functional part of the brake, and reading-in a braking request signal and/or a brake pressure signal for the at least one brake;

(b) determining a thermal fault situation when using the temperature signal and the braking request signal and/or the brake pressure signal; and (c) supplying an adapted braking request signal and/or adapted brake pressure signal using the determined thermal fault situation, in order to increase the operational reliability of the at least one thermally stressed functional part of the at least one brake.

* * * * *